United States Patent [19]

Mizuno et al.

[11] Patent Number: 4,682,287

[45] Date of Patent: Jul. 21, 1987

[54] ELECTRONIC ODOMETER

[75] Inventors: Tooru Mizuno, Nagoya; Keizi Oosugi, Kariya; Motoharu Esaki, Oobu; Takao Ogawa, Anjo, all of Japan

[73] Assignee: Nippondenso Co., Ltd., Kariya, Japan

[21] Appl. No.: 645,154

[22] Filed: Aug. 28, 1984

[30] Foreign Application Priority Data

Aug. 30, 1983 [JP] Japan ................................ 58-158387

[51] Int. Cl.$^4$ ........................ G06F 15/20; G01C 22/02
[52] U.S. Cl. .................................... 364/561; 377/24; 235/95 R
[58] Field of Search ............. 364/424, 561; 235/95 R; 377/24

[56] References Cited

U.S. PATENT DOCUMENTS

| | | | |
|---|---|---|---|
| 4,031,363 | 6/1977 | Freeman et al. | 377/24 |
| 4,409,663 | 10/1983 | Becker et al. | 364/561 |
| 4,539,641 | 9/1985 | Kawashimo et al. | 364/561 |
| 4,559,637 | 12/1985 | Weber | 364/561 |

FOREIGN PATENT DOCUMENTS 56-84511  7/1981  Japan ................................ 235/95 R

*Primary Examiner*—Gary Chin
*Attorney, Agent, or Firm*—Cushman, Darby & Cushman

[57] ABSTRACT

In an electronic odometer for a wheeled vehicle, a non-volatile memory circuit includes a main memory having 256 cells in sequence for non-volatilely storing first data indicative of a unit mileage of the vehicle upon each application of the first data to the memory circuit. The memory circuit also includes an auxiliary memory having 32 cells in sequence for non-volatilely storing second data indicative of 256 times of the unit mileage upon each application of the second data to the memory circuit. A microcomputer repetitively determines the unit mileage in relation to the actual vehicle speed to search each cell of the main memory as to storage of the first data in each cell of the main memory. The microcomputer applied the first data to the memory circuit upon each search of no storage of the first data in at least one cell of the main memory and also applies the second data to the memory circuit upon each search of storage of the first data in each cell of the main memory. Upon application of the second data to the memory circuit, the first data is erased from each cell of the main memory. A display indicates a total mileage of the vehicle based on the contents in the memory circuit.

4 Claims, 5 Drawing Figures

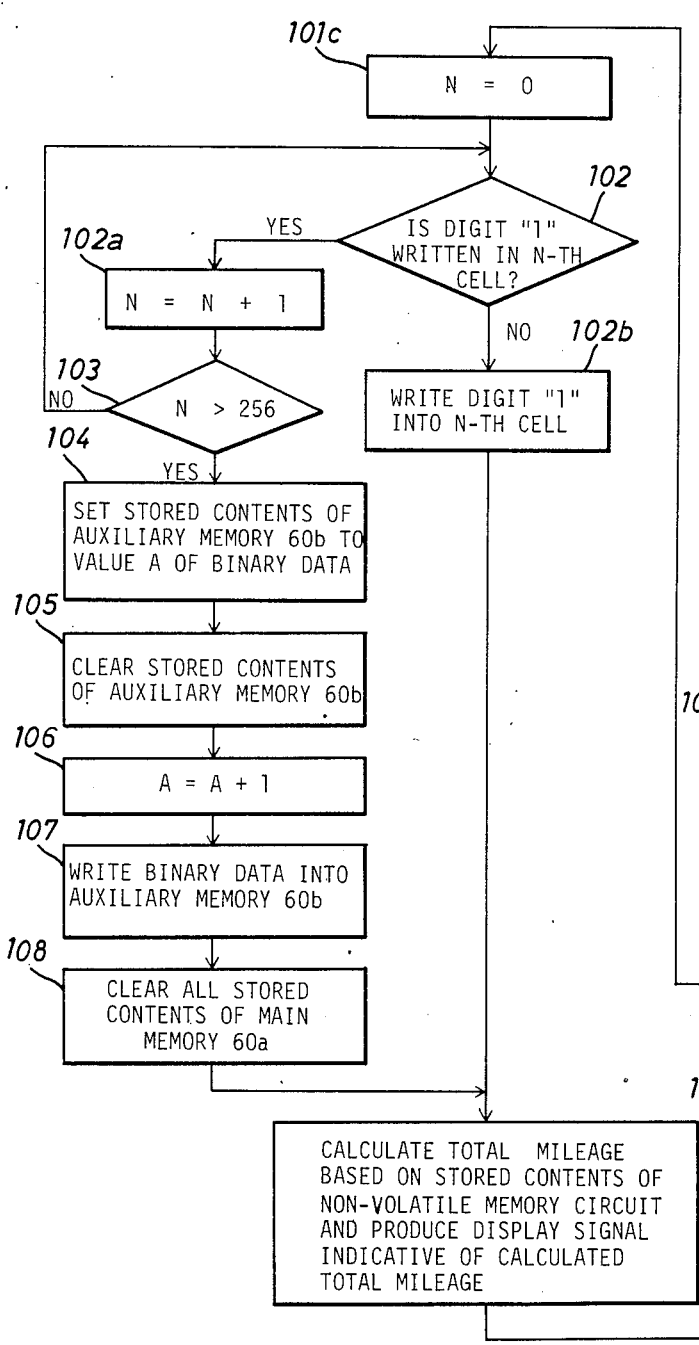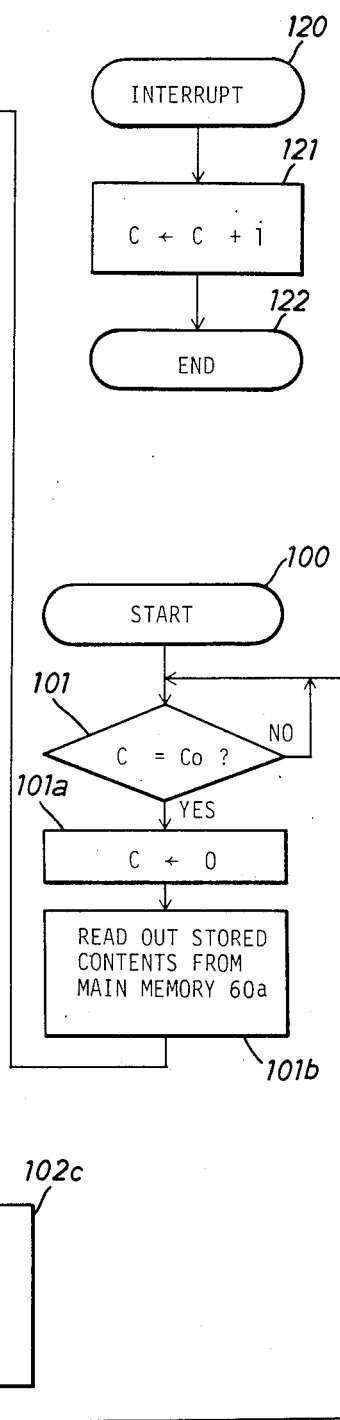

ELECTRONIC ODOMETER

BACKGROUND OF THE INVENTION

The present invention relates to an odometer adapted for use in a wheeled vehicle, and more particularly to an electronic odometer suitable for repetitively summing a distance traveled by the vehicle in relation to the actual vehicle speed and for displaying each of the summed distances in sequence as a total mileage of the vehicle.

In such a conventional electronic odometer, each of the summed distances is sequentially written non-volatilely into or erased from a non-volatile memory element. One of the summed distances, which is written updatedly into the non-volatile memory element, is always displayed as the total mileage of the vehicle. However, due to the rated characteristics of such memory, the number of times of writing and erasing from the non-volatile memory element is limited, e.g. to a permissible limit of 10,000 times. From this limitation, it will be easily understood that it is difficult to repetitively write each of the summed distances into the non-volatile memory element over the maximum total mileage of 100,000 (km) to be travelled by the vehicle.

SUMMARY OF THE INVENTION

It is therefore, a primary object of the present invention to provide an electronic odometer adapted for use in a wheeled vehicle, capable of repetitively writing into or erasing from a non-volatile memory over the maximum total mileage of the vehicle within a permissible limitation of a frequency in writing into or erasing from the non-volatile memory.

According to the present invention, there is provided an electronic odometer adapted for use in a wheeled vehicle, which comprises:

first means for producing a series of speed signals indicative respectively of the actual speed of the vehicle;

second means for repetitively determining a predetermined unit mileage of the vehicle in accordance with a series of the speed signals;

third means provided with a first to mn-th storage areas in sequence for non-volatilely storing first data indicative of the predetermined unit mileage at each time when the first data is applied to the third means;

fourth means provided with a plurality of storage areas in sequence for non-volatilely storing second data indicative of mn times of the predetermined unit mileage at each time when the second data is applied to the fourth means;

fifth means responsive to each determination of the predetermined unit mileage for sequentially searching the first to mn-th storage areas of the third means as to whether or not the first data is non-volatilely stored in the first to mn-th storage areas of the third means respectively;

sixth means for applying the first data to the third means at each time when the fact that the first data is not stored in at least one of the first to mn-th storage areas of the third means is determined by search of the fifth means;

seventh means for applying the second data to the fourth means at each time when the fact that the first data is non-volatilely stored respectively in the first to mn-th storage areas of the third means is determined by search of the fifth means, the seventh means simultaneously erasing the first data from the first to mn-th storage areas of the third means; and eighth means for indicating a total mileage of the vehicle in relation to the contents respectively stored non-volatilely in the third and fourth means.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 4 is a flow diagram indicating a main control program to be performed by the microcomputer shown in block form in FIG. 1; and FIG. 5 is a flow diagram indicating an interrupt control program to be performed by the microcomputer.

DESCRIPTION OF THE PREFERRED EMBODIMENT

Figure 1:
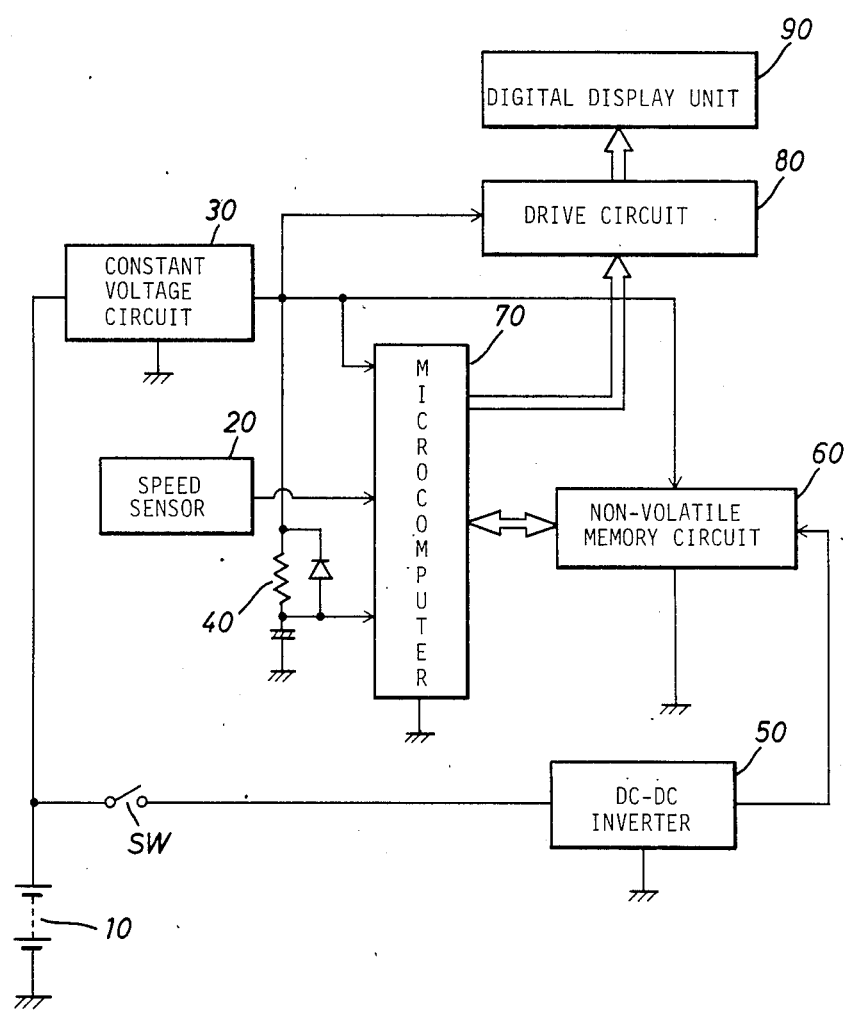
FIG. 1 is a circuit diagram of an electronic odometer for use with a wheeled vehicle.

Referring now to FIG. 1 of the drawings, there is illustrated a block diagram of an electronic odometer in accordance with the present invention for a wheeled vehicle. The electronic odometer is provided with a speed sensor 20, a constant voltage circuit 30 connected to a DC source of electricity in the form of a vehicle battery 10 and with a power-on reset circuit 40 connected to constant voltage circuit 30. The speed sensor 20 detects the actual travel speed of the vehicle to produce a series of pulse signals respectively with a frequency proportional to the detected actual travel speed. In the embodiment, the number 2548 represents the number of pulse signals from speed sensor 20 which corresponds to a predetermined mileage 1 (km) of the vehicle. The constant voltage circuit 30 is directly supplied with an electric power from vehicle battery 10 to produce a constant voltage of 5 (V). The power-on reset circuit 40 is responsive to the constant voltage from constant voltage circuit 30 to produce a reset signal therefrom.

Figure 2:
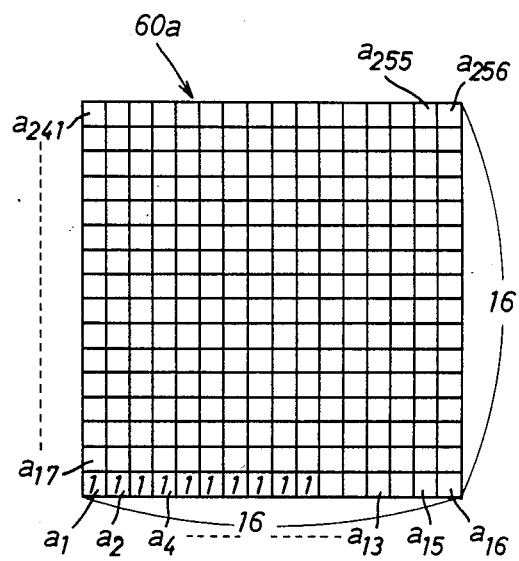
FIG. 2 illustrates cells of a main non-volatile memory of the non-volatile memory cirucit shown in block form in FIG. 1.
Figure 3:
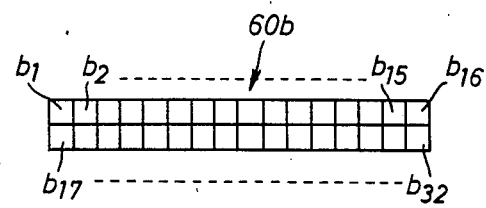
FIG. 3 illustrates cells of an auxiliary non-volatile memory if the non-volatile memory circuit.

The electronic odometer is further provided with a DC-DC inverter 50 connected to vehicle battery 10 through an ignition switch SW of the vehicle, with a non-volatile memory circuit 60 connected to DC-DC inverter 50 and with a microcomputer 70 connected to speed sensor 20, constant voltage circuit 30, power-on reset circuit 40 and non-volatile memory circuit 60. The DC-DC inverter 50 is supplied with the electric power from vehicle battery 10 upon closure of ignition switch SW to produce a predetermined negative voltage of −28 (V). The non-volatile memory circuit 60 includes a main non-volatile memory 60a which has 256 cells or storage areas $a_1, a_2, \ldots a_{255}, a_{256}$ to provide a memory capacity of 16 bits × 16 words, as shown in FIG. 2. The memory circuit 60 further comprises an auxiliary non-volatile memory 60b which has 32 cells or storage areas $b_1, b_2, \ldots b_{31}, b_{32}$ to provide a memory capacity of 16 bits × 2 words, as shown in FIG. 3. Each of main and auxiliary non-volatile memories 60a, 60b is responsive to the constant and negative voltages respectively from constant voltage circuit 30 and DC-DC inverter 50, to ready these memories for being written thereinto or erased therefrom. An advantageous characteristic of these non-volatile memories is that irrespective of the constant and negative voltages respectively from constant voltage circuit 30 and DC-DC inverter 50, each of memories 60a, 60b will hold contents written thereinto.

The microcomputer 70 is responsive to the constant voltage from constant voltage circuit 30 and the reset signal from power-on reset circuit 40 to be ready for operation, and repetitively executes main and interrupt control programs in accordance with flow diagrams shown in FIGS. 4 and 5. The main and interrupt control programs are previously stored in microcomputer 70. During the repetitive execution, the microcomputer 70 performs calculation of the number of a series of the pulse signals from speed sensor 20 corresponding to the actual vehicle speed, writing into or erasing from non-volatile memory circuit 60 and control of a drive circuit 80 connected to a digital display unit 90, as described later. The drive circuit 80 is responsive to the constant voltage from constant voltage circuit 30 to be ready for operation and cooperates with microcomputer 70 to render the display unit 90 digitally indicate a total mileage of the vehicle.

In operation, upon start of the vehicle with the ignition switch SW closed, the speed sensor 20 produces a pulse signal in sequence, and the microcomputer 70 receives each of the pulse signals from speed sensor 20 in sequence as an interruption signal, repetitively to perform the interrupt control program in accordance with the flow diagram of FIG. 5. In this instance, the microcomputer 70 is responsive to each of the pulse signals to halt execution of the main control program which was previously initiated in accordance with the flow diagram of FIG. 4. During the repetitive execution of the interrrupt control program, the microcomputer 70 increments sequentially a value C of a speed count data by one in response to each of the pulse signals from speed sensor 20 at step 121. In addition, upon receipt of a predetermined negative voltage appearing from DC-DC inverter 50 caused by closure of ignition switch SW, the non-volatile memory circuit 60 is readied for being written thereinto or erased therefrom. At this stage, it will be assumed for purposes of example, that immediately before the above-mentioned closure of ignition switch SW, a total mileage of 10 (km) is digitally indicated by the display unit 90. This means that the digit "1" is respectively written or stored non-volatilely into only the cells $a_1, a_2, \ldots, a_9, a_{10}$ of main memory 60a of memory 60a of memory circuit 60 (See FIG. 2).

When the main control program returns to a step 101 after a value C of the updated speed count data at step 121 becomes a predetermined count value Co, the microcomputer 70 determines a "YES" answer to advance the main control program to the following step 101a. In the embodiment, the predetermined count value Co described above is the number 2548 of a series of pulse signals from speed sensor 20 corresponding to a predetermined mileage of 1(km). This number has been previously stored in the microcomputer 70. When the main control program proceeds to the step 101a, as previously described, the microcomputer 70 resets a value C of the speed count data equal to zero and reads out stored contents from main memory 60a at a step 101b. A counting value N indicative of cell number data is set equal to zero at a step 101c.

Thereafter, the microcomputer 70 repeats the main control program passing through steps 102, 102a and 103. Because the digit "1" is written repectively into the cells $a_1, \ldots, a_{10}$ of main memory 60a, as previously described, the microcomputer 70 repetitively determines a "YES" answer at step 102 when N<11. Each time, a value N of the cell number data is incremented by one at step 102a. A "no", determined at step 103, indicating N<256, since N<11 in this example. In the embodiment, the number 256 at step 103 indicates the total cell number of main memory 60a. When a value N of the updated cell number data at step 102a becomes 11, the microcomputer 70 determines a "NO" answer at step 102, since there is no "1" in the 11th cell. Thus, the digit "1" is non-volatilely written at a step 102b into the cell $a_{11}$ of main memory 60a corresponding to N=11. Then, the main control program proceeds to a step 102c where the microcomputer 70 calculates a total mileage of the vehicle based on the written contents in the cells $a_1$ to $a_{11}$ of main memory 60a and produces a display signal indicative of the calculated total mileage of 11 (KM). In this instance, the total mileage is calculated from the following equality:

$$D_T = (Na = Nb \times 256) \times 1 \text{ (km)}$$

where $D_T$ is the total mileage, where Na is the number of cells of non-volatile main memory 60a in which the digit "1" is respectively written, and where Nb is the number of cells of non-volatile auxiliary memory 60b in which the digit "1" is respectively written.

When the display signal appears from microcomputer 70, as previously described, the drive circuit 80 produces a drive signal which is applied to the display unit 90. Thus, the display unit 90 is responsive to the drive signal from the drive circuit 80 to digitally indicate a total mileage 11 (km) of the vehicle. After this indication, based on the decision at step 102, the microcomputer 70 repeats execution of the main control program passing through the steps 102, 102a and 103 or passing through the steps 102, 102b and 102c, as previously described.

When the digit "1" is non-volatilely written into the cell $a_{256}$ of main memory 60a at step 102b, the decision at step 103 will become "YES" based on N=257 updated at step 102a. At this point the microcomputer 70 reads out the contents from all the cells of auxiliary memory 60b to set these same contents to a binary value A. This means A=0 in this example. Then, the microcomputer 70 clears or erases written contents in all the cells of auxiliary memory 60b at a step 105, increments a value A of the binary data by one at a step 106, non-volatilely writes the incremented value A of the binary data into the cell $b_1$ of auxiliary memory 60b, and then clears the written contents in all the cells $a_1$ to $a_{256}$ of main memory 60a. At this stage, the display unit 90 indicates a total mileage 256 (km) of the vehicle on a basis of calculation at step 102c.

Thereafter, based on changes of the decisions at steps 102, 103, the microcomputer 70 repeats execution of the main control program passing through the steps 102, 102a and 103, passing through the steps 102, 102b and 102c or passing through the steps 104 to 108. During the repetations, the digit "1" is non-volatilely written into cells $a_1, a_2, \ldots, a_{256}$ of main memory 60a in sequence, a value A of the binary data is repetitively incremented by one on a basis of written contents in all the cells of main memmory 60a, and written contents in the main memory 60a is repetitively cleared. In other words, each time that the vehicle travels 256 (km), data indicative of a mileage 256 (km) defined by the digit "1" written respectively into all the cells of main memory 60a is shifted and non-volatilely written sequentially into the cells $b_1, \ldots, b_{32}$ of auxiliary memory 60b as the digit "1".

From the above description, it will be clearly understood that even if a frequency in writing into the main memory 60a is limited in a permissible value of 10,000 times, the non-volatile memory circuit 60 can still precisely store a very large total mileage $D_T$. For instance, $D_T = 256 \times 10^3 \text{(km)} = 256$, capacity of 60,000 (km) (number of writing times) when using 1,000 writing times under cooperation of main and auxiliary memories 60a, 60b to be displayed by the display unit 90. This means that the non-volatile memory circuit 60 can be easily adopted for practical use, because a total mileage of the vehicle is, in general, determined 100,000 (km). Although in the above embodiment the predetermined count value Co indicates 1 (km), it may be modified to indicate, for instance, 2 (km).

While in the above embodiment the main memory 60a of memory circuit 60a is provided with a memory capacity of 16 bits×16 words, the memory capacity of main memory 60a may be in general modified into m bits×n words.

Although in the above embodiment the auxiliary memory 60b of memory circuit 60 is provided with 32 cells $b_1$ to $b_{32}$, the number of the cells of auxiliary memory 60b may be modified in necessity.

For practice of the present invention, the electronic odometer may be also modified to include an additional digital display unit, an additional drive circuit and an additional manual switch. In this case, the microcomputer 70 is arranged to store, in response to actuation of the additional manual switch, contents written into the memory circuit 60, and the additional digital display unit is arranged to cooperate with the additional drive circuit in such a manner to display a difference between the stored contents in the microcomputer 70 and contents written actually into the memory circuit 60. This means that the electronic odometer may also act as a trip meter for the vehicle.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method for operating an electronic odometer in a wheeled vehicle, comprising the steps of:
    producing a series of speed signals indicative of a speed of the vehicle;
    determining a predetermined unit travel distance of the vehicle in accordance with a series of said speed signals;
    non-volatilely storing first data indicative of said predetermined unit travel distance in a first storage means provided with first to mn-th storage areas which can each store a binary digital value in sequence, the binary contents in only one of said storage areas being changed for each increment of said unit travel distance;
    non-volatilely storing second data indicative of mn times said predetermined unit travel distance in a second storage means provided with a plurality of other storage areas in sequence;
    sequentially searching the first to mn-th storage areas of said first storage means for determining whether said first data is non-volatilely stored in all of the first mn-th storage areas of said first storage means;
    applying said first data to said first storage means each time when said first data is not stored in all of the first to mn-th storage areas of said first storage means as determined in said sequentially searching step;
    applying said second data to said second storage means each time when said first data is non-volatilely stored in all of the first to mn-th storage areas of said first storage means as determined in said seqentially searching step and simultaneously erasing said first data from all of the first to mn-th storage areas of said first storage means; and
    indicating a total mileage of the vehicle in relation to the contents respectively stored non-volatilely in said first and second storage means.

2. An electronic odometer adapted for use in a wheeled vehicle, comprising:
    speed detecting means for producing a series of speed signals, respectively indicative of a speed of the vehicle;
    main non-volatile memory means, having first to mn-th storage means each of which can respectively store therein a first binary digit indicative of a predetermined unit travel distance of the vehicle only one of said storage areas changing its stored binary digit value in response to the increment if said predetermined unit travel distance;
    auxiliary non-volatile memory means for incrementally storing therein a plurality of second binary digits, each indicative of mn times said predetermined unit travel distance
    data processing means including : (a) first means for repetitively determining said predetermined unit travel distance in response to said speed signals, (b) second means responsive to each determination of said predetermined unit travel distance for sequentially searching said storage areas of said main non-volatile memory means to determine whether said first binary digit is respectively stored in all the storage areas of said main non-volatile memory means, and for applying said first binary digit to only one of the non-stored storage areas of said main non-volatile memory means if said first binary digit is not stored in all of said storage areas, and for applying said second binary digit to said auxiliary non-volatile memory means and erasing all of said first binary digits stored in the storage areas of said main non-volatile memory means if said first binary digit is stored in all of said storage areas, and (c) third means for determining a total mileage of the vehicle based on the first and second binary digits respectively stored in said main and auxiliary non-volatile memory means and for producing an output signal indicative thereof; and
    display means responsive to the output signal from said third means of said data processing means for indicating the total mileage of the vehicle.

3. An electronic odometer as recited in claim 2, wherein said main non-volatile memory means has first to n$_2$th storage areas for n bits×n words for respectively storing therein said first binary digit of a value "one", and said auxiliary non-volatile memory means has a plurality of storage areas for sequentially storing therein a second binary digit "one" indicative of a total of said first binary digits stored in all the storage areas of said main non-volatile memory means.

4. An electronic odometer as recited in claim 2, wherein said main non-volatile memory means has first to 256th storage areas for 16 bits×16 words for respectively storing a first binary digit "one" indictive of 1 kilometer, and said auxiliary non-volatile memory means has a plurality of storage areas for sequentially storing therein a second binary digit "one" indicative of a total said first binary digits stored in all the storage areas of said main non-volatile memory means.

* * * * *